United States Patent
Frelier

(10) Patent No.: US 9,255,411 B1
(45) Date of Patent: Feb. 9, 2016

(54) RAIN GUTTER WITH CYCLONIC DEBRIS EJECTION

(71) Applicant: Calvin Arthur Frelier, Rochester, NY (US)

(72) Inventor: Calvin Arthur Frelier, Rochester, NY (US)

(*) Notice: Subject to any disclaimer, the term of this patent is extended or adjusted under 35 U.S.C. 154(b) by 0 days.

(21) Appl. No.: 13/926,118

(22) Filed: Jun. 25, 2013

Related U.S. Application Data

(63) Continuation-in-part of application No. 12/930,218, filed on Jan. 3, 2011, now Pat. No. 8,584,403.

(51) Int. Cl.
| | |
|---|---|
| *E04D 13/00* | (2006.01) |
| *B01D 21/26* | (2006.01) |
| *A46B 11/06* | (2006.01) |
| *E04D 13/076* | (2006.01) |
| *B04C 5/08* | (2006.01) |
| *E04D 13/04* | (2006.01) |
| *E04D 13/064* | (2006.01) |
| *B04C 3/00* | (2006.01) |
| *B04C 5/081* | (2006.01) |

(52) U.S. Cl.
CPC .......... *E04D 13/076* (2013.01); *E04D 13/0431* (2013.01); *B01D 21/26* (2013.01); *B01D 21/265* (2013.01); *B01D 2221/12* (2013.01); *B04C 3/00* (2013.01); *B04C 5/08* (2013.01); *B04C 5/081* (2013.01); *B04C 2003/003* (2013.01); *B04C 2003/006* (2013.01); *E04D 13/04* (2013.01); *E04D 13/0404* (2013.01); *E04D 13/064* (2013.01)

(58) Field of Classification Search
None
See application file for complete search history.

(56) References Cited

U.S. PATENT DOCUMENTS

| | | | | |
|---|---|---|---|---|
| 5,189,849 A | * | 3/1993 | Collins | .......................... 52/12 |
| 5,638,643 A | * | 6/1997 | Demartini et al. | ................. 52/11 |

OTHER PUBLICATIONS

Almesco Building Products Victorian Ogee Profile http://www.almesco.co.uk/eg-Victorianogee.htm.
Cast Aluminum Victorian Ogee http://www.aluminiumfabricationproducts.co.uk/cast-aluminium-guttering-systems/cast-aluminium-guttering/victorian-cast-aluminium-guttering/victorian-ogee-cast-aluminium-gutter-1-83mlth.html.
Cast Iron Victorian Ogee http://www.rainclear.co.uk/index.asp?cat1=2&cat2=368d=Victorian+Ogee.
Elegance Victorian Ogee http://www.angelplastics.co.uk/Category/556/Victorian-Ogee-Cast-Iron-Rainwater-System.
http://www.riversidesheetmetal.net/gutters/custom/.
http://www.custom-carpentry.net/jobs/Steve/new-cornice/tn_P1650055.JPG.
http://chestofbooks.com/architecture/Building-Trades-Pocketbook/Gutters.html.

\* cited by examiner

*Primary Examiner* — Nam Nguyen
*Assistant Examiner* — Richard Gurtowski

(57) ABSTRACT

An open fluid channel with wind powered cyclonic separation for debris removal. The present disclosure is a channel shape, applied to a rain gutter, that harnesses wind energy to create cyclonic separation wherein channel debris, excited to rotary motion by a vortex are, upon gaining sufficient angular momentum ejected from the channel, reducing the need to manually clear the rain gutter.

20 Claims, 3 Drawing Sheets

RAIN GUTTER WITH CYCLONIC DEBRIS EJECTION

BACKGROUND INFORMATION

The present disclosure relates to a rain gutter and more specifically a fluid flow channel with features to foster cyclonic circulation within the channel to eject debris.

Conventional rain gutter systems include generally horizontal gutters to collect water from a roof surface, and vertical downspouts to drain water from the gutters to the ground below. A problem with such gutters is that they also accumulate debris such as leaves. These accumulations must be removed from time to time, and someone standing on a ladder typically does this manually.

Cyclonic clearing of debris, from a channel used for rainwater conveyance, serendipitously discovered while testing a channel adapted to a fluid flow scavenging system without the benefit of the scavenger assembly. The fluid flow scavenging system is the subject of pending application Ser. No. 12/930,218.

Environmental tests of the fluid flow channel without a scavenger system showed it to be unusually clear for its location relative to tree foliage and expected debris deposition rates. Initial observation showed a gutter channel would fill with leaf and seed litter and subsequent inspection showed a clear channel. It was then theorized that wind action was somehow interacting with the channel to eject leaf litter better than anticipated. To check if a similar result would be observed, testing was conducted on two additional homes with correlating outcomes. Video analysis, under controlled conditions, showed rotational movement of leaf litter in the channel prior to expelling, which is consistent with particle movement in cyclonic separation devices that harness vortical motion to separate particles from a gas.

A search of prior art gutter channel profiles has shown that none appear to efficiently harness cyclonic circulation as a means to eject debris from a gutter channel. An extensive search of gutter profiles that could potentially act in a similar manner found the Victorian Ogee profile, common in Great Britain, to be relevant prior art. Testing of a simulated Victorian Ogee profile showed it was not well optimized to take advantage of cyclonic separation.

Other prior art shows ogee wooden gutter profiles to also be relevant. None were tested as of the writing of this application. However, analysis of the shape in light of what this application reveals shows them to be suboptimal in terms of cyclonic separation as a debris ejection mechanism.

The present disclosure reveals what is a previously unharnessed functionality applied to rain gutters which can offer a lower cost simplified solution to the problem of maintaining clear rain gutters.

SUMMARY

In summary, the present disclosure is a channel shape, applied to a rain gutter, that harnesses wind energy to create cyclonic separation wherein channel debris, excited to cyclonic motion by a vortex are, upon gaining sufficient angular momentum, ejected from the channel.

DRAWINGS

The drawings described herein are for illustrative purposes only and are not intended to limit the scope of the present disclosure in any way.

FIG. 1 is a left front perspective of my rain gutter with cyclonic debris removal 70 suitably attached to a structure under the edge of a roof 10 depicting cyclonic air movement in proximity to channel 60.

FIG. 2 is a right side view of the rain gutter 70 attached to fascia 12 depicting cyclonic inter-action of air currents within cyclonic channel 60.

FIG. 3 is a right side view of the rain gutter 70 showing details of the cyclonic features of channel 60.

FIG. 4 is a right side view of the rain gutter 70 in a different embodiment attached to fascia 12 showing cyclonic inter-action of air currents within channel 60.

DESCRIPTION

Figure 1:
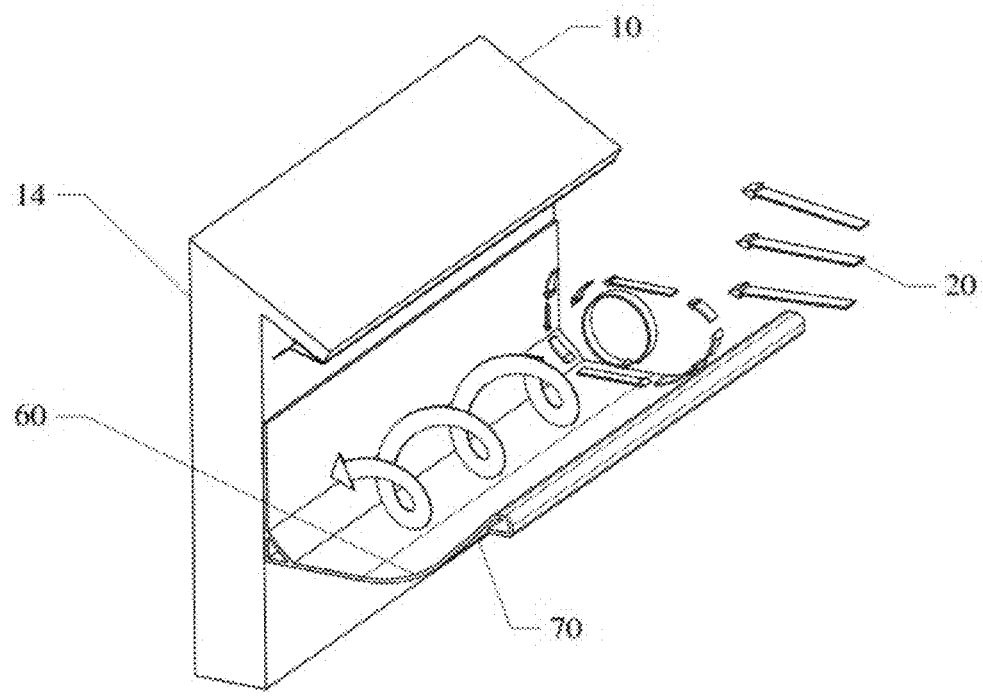

With reference now to the drawing figures:

FIG. 1 shows a cyclonic separation rain gutter 70, mounted under roof 10 with an incident air current 20 pointed towards gutter 70.

FIG. 1 also depicts three dimensional air circulations within a fluid flow channel 60.

Figure 2:
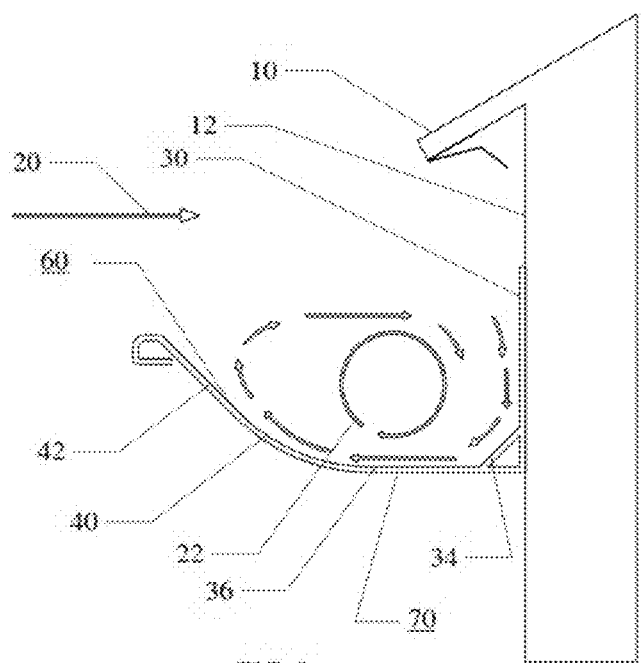

FIG. 2 shows channel 60 having features to promote and sustain a cyclonic vortex. Cyclonic motions of air are rotary air currents within channel 60 that cause debris to be expelled by virtue of acquired rotational velocity and momentum from vortex 22.

Figure 4:
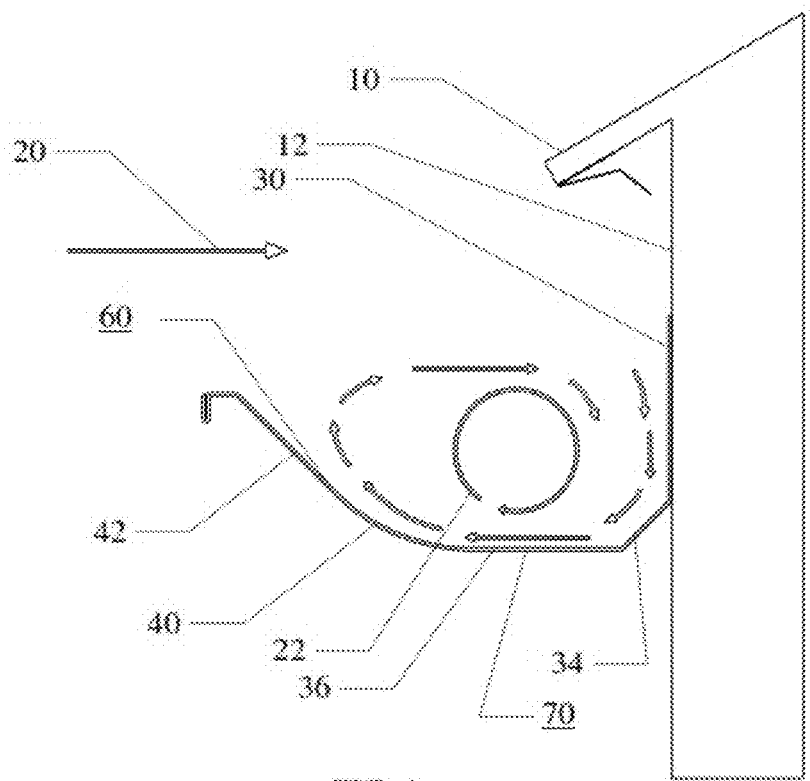

In FIG. 2 a back wall surface 30 serves as a portion of the channel and an abutment surface. FIGS. 2 & 4 shows gutter 70 suitably attached to fascia 12 using fasteners (not shown). The fascia 12 may also act as an abutment surface. An abutment surface is a surface that interacts with air current 20 to influence vortex formation. An incident air current 20 that interacts with an abutment surface may be deflected into, below, or above fluid flow channel 60.

In FIGS. 2 & 4 air currents circulating within channel 60 interact with a reflective surface 34 which directs them along a floor surface 36 and towards a vortex-enhancement curved surface 40. The curved surface 40 turns the rotating air up towards current 20. A ramp surface 42 creates a forward wall relative to the back wall surface 30 to create a channel and acts as an ejection path for debris (not shown).

FIG. 2 shows a fluid flow channel 60 with features to promote and sustain a vortex 22. The vortex 22 is a circular airflow characterized by a pressure gradient with lowest pressure at its center. Generally, a vortex is characterized by vorticular motion, meaning air or gas spinning about a center. As an aside, vorticular motion can be either rotational or irrotational. A hurricane is an example of irrotational motion where, to an external observer, particles away from the center appear to not rotate on their own axis. In contrast, a carousel is an example of rotational motion, where to an outside observer, looking down, and the model horses (not shown) appear to rotate about their own axis or poles. Put more simply, in a rotational vortex, if an observer's frame of reference were on the carousel at its center, the model horses of the carousel would not appear to rotate about their center poles. If, on the other hand, the carousel horses exhibited irrotational vortex motion, the observer standing at the center of the carousel would observe the model horses rotating about their center poles as the carousel revolved.

The above discussion is relevant to the present disclosure because vorticular motion inside of a cyclonic separator is rotational and driven by a tangential injection of air, compared to the tornadic action of a tornado or hurricane.

An irrotational vortex is typically motivated along the internal portion of the vortex while a rotational vortex is driven along its edge by a tangential force. Rotational and irrotational vortices are recognized by orbiting particulate motion.

Figure 3:
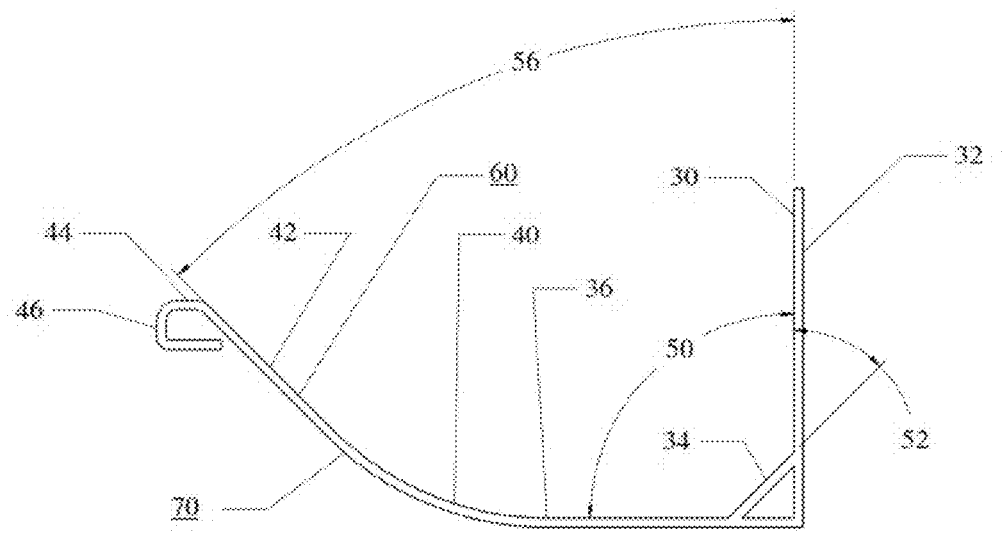

FIG. 3 shows rain gutter 70 in detail. Gutter 70 is 3.7" in height and 7" in width and formed by an aluminum extrusion process with walls that are 0.1" thick. Alternatively, rain gutter 70 may be formed in a plastic extrusion process or using some other non-organic substance to avoid decay.

FIG. 3 also shows the channel 60 profile in detail. Wall surface 30 is 2.8" tall. Reflective surface 34 is 1" long with a reflective angle 52 of 45°. Floor surface 36 is 2.25" in length and floor angle 50 is 90°. Curved surface 40 is 3.3" in radius. Ramp angle 56 is 45°. Ramp surface 42 is 1.9" long. Lip surface 44 is 0.375" in width and 2.5" in height above the bottom of gutter 70. Depending surface 46 0.4" in height and 7" forward of the back wall of gutter 70.

FIG. 4 shows and alternate embodiment in which gutter 70 is constructed of formed aluminum sheets 0.05" in thickness in which forming is done with a brake press or roll forming methods.

Figure 5:
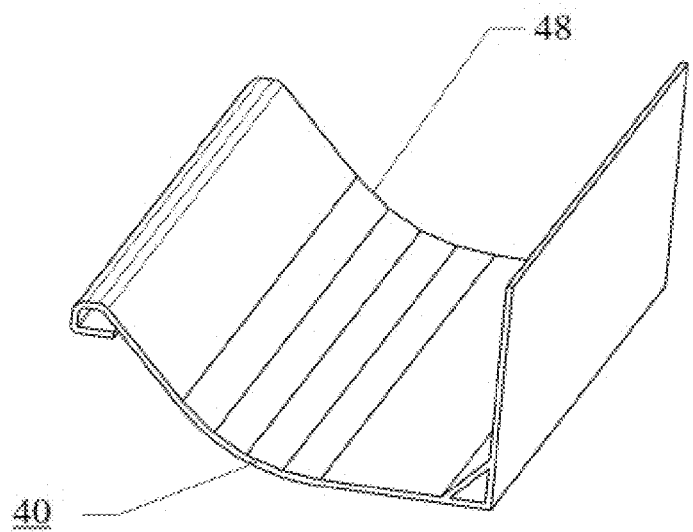
FIG. 5 is a right rear perspective view of the rain gutter 70 where a rounded portion of cyclonic channel 60 is comprised of a series of flats.

FIG. 5 shows how curved surface 40 may be approximated using a series of flat surfaces.

Figure 6:
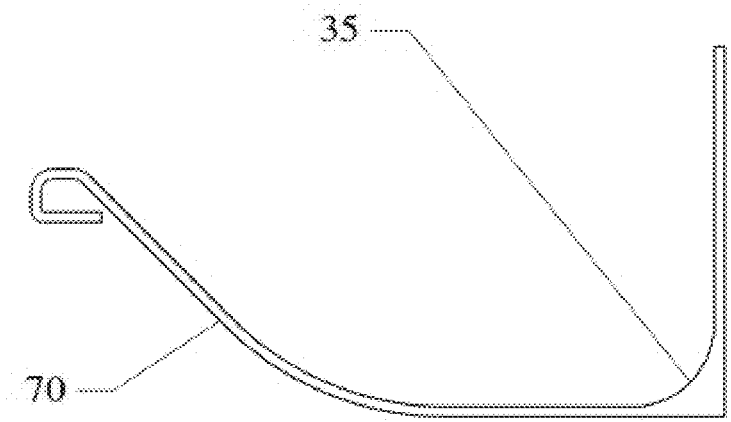
FIG. 6 is a right side view of the rain gutter 70 showing a curved reflective surface 35.

FIG. 6 shows a curved reflective surface 35 with a 0.8" radius of curvature.

OPERATIONAL DESCRIPTION

Because airflow is turbulent and invisible, all descriptions of air movement herein are illustrative.

FIGS. 2 & 4 show wind modeled as a perpendicular current of air moving towards fascia 12 and rear wall surface 30. Both fascia 12 and rear wall surface 30 can serve as abutment surfaces. At an abutment surface, the local velocity in the current is zero, and per Bernoulli's equations, the static pressure is highest. The locally higher static pressure before the abutment surface above channel 60 causes the perpendicular current to diverge and a portion thereof to flow into the channel.

Airflow diverted into channel 60 stimulates circulation within the channel as, illustrated in FIG. 2, to create rotational flow. Vorticular motion is necessary for cyclonic separation in which a fluid transfers angular momentum to resident debris. Upon achieving sufficient angular momentum, debris is expelled from channel 60.

Pressure inside of channel 60 will tend to vary from least at the center of the vortex 22 to greatest at a boundary. Pressure variation in combination with centrifugal forces acting on debris causes cyclonic separation in which denser debris migrates towards a boundary, and sufficiently less dense debris towards the center of vortex 22.

Debris of greatest density, acquiring sufficient momentum and velocity, may be ejected from channel 60 along ramp surface 42 while less dense debris may spiral along the length of channel 60 and eject at an end or corner (not shown) of channel 60 as illustrated in FIG. 1. Lateral ejection occurs because of local variations in current 20 velocities and lateral velocity components within current 20. The term "lateral" here indicates approximately parallel to gutter 70. Lighter debris may also achieve an escape velocity where their centrifugal momentum overcomes the vacuum of vortex 22 and fly upward into air current 20 to be carried away from channel 60.

Vortical flow in an open channel is motivated by air current 20 and it will tend to be turbulent. Turbulence contributes to the motivation of debris out of channel 60.

Circle and Radius of Curvature

The circle that is tangent to a plane curve at P, whose center lies on the concave side of the curve and that has the same curvature as the curve has at P, is called the circle of curvature. Its radius is 1/k. The radius of curvature ρ at P is defined to be Radius of curvature $$\rho = \frac{1}{\kappa} = \frac{\left[1 + \left(\frac{dy}{dx}\right)^2\right]^{\frac{3}{2}}}{\left|\frac{d^2 y}{dx^2}\right|}.$$

In the following claims, any terms indicative of orientation are intended to correspond with the illustrations as an aid to understanding the present disclosure. Such terms are not intended as positive limitations. The concept and scope of the present disclosure are only limited by the following claims.

| PARTS LIST | | |
| --- | --- | --- |
| Number | Name | FIG. |
| 10 | Roof | 1, 2 |
| 12 | Fascia | 2, 4 |
| 14 | Structure | 1 |
| 20 | Air Current | 1, 2, 4 |
| 22 | Vortex | 2, 4 |
| 30 | Back Wall Surface | 2, 3, 4 |
| 32 | Back Wall | 3 |
| 34 | Reflective Surface | 2, 3, 4 |
| 35 | Curved Reflective Surface | 6 |
| 36 | Floor Surface | 2, 3, 4 |
| 40 | Vortex-Enhancement Curved Surface | 2, 3, 4, 5 |
| 42 | Ramp Surface | 2, 3, 4 |
| 44 | Lip Surface | 3 |
| 46 | Depending Surface | 3 |
| 48 | Flat surface | 5 |
| 50 | Floor Angle | 3 |
| 52 | Reflective Angle | 3 |
| 56 | Ramp Angle | 3 |
| 60 | Fluid Flow Cyclonic Channel | 2, 3, 4, 5 |
| 70 | Rain Gutter with Cyclonic Debris Removal | 1, 2, 3, 4, 5, 6 |

The invention claimed is:

1. A rain gutter having cyclonic debris removal comprising:
   a channel for conveyance of fluid flow including a back wall surface, a floor surface, and a front wall surface forming a channel therealong for conveyance of fluid;
   said channel further comprising a curved surface that promotes and sustains an airflow vortex for wind powered debris expulsion from said channel;
   said curved surface having a radius of curvature of at least 1.5 inches;
   said curved surface disposed between said back wall surface and said front wall surface;
   said curved surface forming a portion of said front wall surface;
   said curved surface located at least 1.5 inches from said back wall surface;
   said front wall surface further comprising a ramp surface for wind powered debris expulsion from said channel;
   said ramp surface angled relative to said back wall not more than 61 degrees;

wherein an uppermost portion of said ramp surface is at least 1.5 inches above said channel's lowest point; and said ramp surface is angled relative to said back wall surface not less than 29 degrees.

2. The rain gutter of claim 1, wherein the curved surface is located at least 1.75 inches from said back wall surface.

3. The rain gutter of claim 1, wherein the curved surface is located at least 2.0 inches from said back wall surface.

4. The rain gutter of claim 1, wherein the channel further comprises a reflective surface.

5. The rain gutter of claim 1, wherein the curved surface comprises a profile further comprising a plurality of flats approximating a curved surface.

6. The rain gutter of claim 1, wherein an uppermost portion of said ramp surface is not less than 2.0 inches above a lowest point of said channel.

7. The rain gutter of claim 1, wherein the uppermost portion of said ramp surface is not less than 2.3 inches above said floor surface.

8. A rain gutter having cyclonic debris removal comprising:
a channel for conveyance of fluid flow including a back wall surface, a floor surface, and a front wall surface, forming a channel therealong for conveyance of fluid;
said channel further comprising a curved surface that promotes and sustains an airflow vortex for wind powered debris expulsion from said channel;
said curved surface having a radius of curvature of at least 1.5 inches;
said curved surface disposed between said back wall surface and said front wall surface;
said curved surface forming a portion of said front wall surface;
said curved surface located at least 1.5 inches from said back wall surface;
said front wall surface further comprising a ramp surface for wind powered debris expulsion from said channel;
said ramp surface angled relative to said back wall not more than 61 degrees;
wherein an uppermost portion of said front wall surface is at least 1.5 inches above said channel's lowest point;
a reflective surface inside of said channel for improved wind powered debris expulsion from said channel;
said reflective surface disposed between said back wall surface and said floor surface; and
said ramp surface angled relative to said back wall surface not less than 29 degrees.

9. The rain gutter of claim 8, wherein said reflective surface further comprises a radius of at least 0.8 inches.

10. The rain gutter of claim 8, wherein said reflective surface is angled relative to said back wall surface between 10 and 80 degrees.

11. The rain gutter of claim 8, wherein said curved surface further comprises a plurality of flats approximating a curved surface.

12. The rain gutter of claim 8, wherein said reflective surface is at least 0.5 inches in length.

13. The rain gutter of claim 8, wherein said reflective surface is angled relative to said back wall surface between 61 and 29 degrees.

14. The rain gutter of claim 8, wherein the uppermost portion of said ramp surface is not less than 2.3 inches above said floor surface.

15. A rain gutter having cyclonic debris removal comprising:
a channel for conveyance of fluid flow including a back wall surface, a floor surface, and a front wall surface, forming a channel therealong for conveyance of fluid;
said channel further comprising a curved surface that promotes and sustains an airflow vortex for wind powered debris expulsion from said channel;
said curved surface disposed between said back wall surface and said front wall surface;
said curved surface having a radius of curvature of at least 1.5 inches;
said curved surface located at least 1.4 inches from said back wall surface;
said front wall surface including a ramp surface for wind powered debris expulsion from said channel;
said ramp surface angled relative to said back wall surface not more than 52 degrees;
wherein an uppermost portion of said ramp surface at least 1.5 inches above said floor surface; and
said ramp surface angled relative to said back wall surface not less than 29 degrees.

16. The rain clutter of claim 15, wherein said ramp surface further comprises an extending surface forward of said ramp surface for conditioning of an incident air current.

17. The rain clutter of claim 16, wherein said extending surface further comprises a depending surface for conditioning an incident air current.

18. The rain clutter of claim 15, wherein said channel further comprises a reflective surface for improved wind powered debris expulsion from said channel.

19. The rain clutter of claim 15, wherein said curved surface further comprises a plurality of flats approximating a curved surface.

20. The rain gutter of claim 15, wherein the uppermost portion of said ramp surface is not less than 2.3 inches above said floor surface.

* * * * *